Nov. 9, 1965  E. C. DUNCAN  3,216,859
SECONDARY BATTERY SEPARATOR AND ELECTRODE ASSEMBLY
Filed Nov. 17, 1961

*INVENTOR.*
EDWARD CARLTON DUNCAN

United States Patent Office 3,216,859
Patented Nov. 9, 1965

3,216,859
SECONDARY BATTERY SEPARATOR AND ELECTRODE ASSEMBLY
Edward Carlton Duncan, Raleigh, N.C., assignor to The Electric Storage Battery Company, a corporation of New Jersey
Filed Nov. 17, 1961, Ser. No. 153,018
6 Claims. (Cl. 136—6)

The present invention generally relates to separators for electric batteries. More specifically, the present invention is concerned with separation systems for alkaline storage batteries which utilize membranes of regenerated cellulose, cellophane, or other materials which exhibit substantial dimensional changes when immersed in electrolytes.

A general object of the present invention is to provide a new and improved separation system particularly adapted for use in alkaline batteries which utilize the effects of dimensional changes in the membrane systems employed to achieve advantages unobtainable with prior art separator systems.

Separation systems as generally employed in alkaline storage batteries, particularly those having negative electrodes of zinc and positive electrodes of silver, utilize one or more layers of regenerated cellulose or cellophane either in the form of a flat sheet, a U-shaped pocket, or some other folded configuration. As mentioned above, it has long been recognized that cellulosic separator materials exhibit substantial dimensional changes when immersed in alkaline electrolytes. Foremost among these dimensional changes is about a 150% increase in thickness upon immersion in an alkaline electrolyte having a concentration within the 20% to 40% range. It is a common practice to utilize the swelling of such materials to establish a positive pressure against the electrode assembly within a cell container.

It is an object of the present invention to utilize the swelling of cellulosic type separator materials to reduce electrolyte evaporation and reduce exposure of the electrodes to the harmful action of air.

It is another object of the present invention to provide, by the utilization of separator swelling, a means to prevent the bridging of negative-active material in a silver-zinc type battery across the top surfaces of the electrodes.

These and other objects of the present invention are accomplished by means of a novel separator construction which utilizes one or more folds along the top edge of the separator where it protrudes above the electrode surface to provide a plurality of separator layers which upon immersion in alkaline electrolyte will swell and press together effectively sealing the top surface of the electrodes. The specific construction described is applicable to all conventional separator configurations wherein a separator edge projects above the top of the electrode assembly.

A better understanding of the present invention may be had from the following description when read with reference to the accompanying drawings of which:

Figure 1:
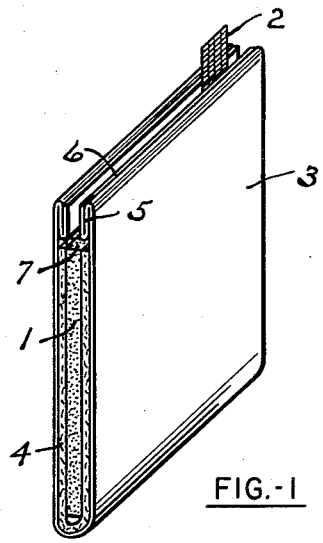
FIG. 1 is a perspective view of a U-shaped separator incorporating the construction of the present invention.

In FIG. 1, the numeral 1 designates an electrode, which may be either positive or negative, having upwardly projecting connecting lug 2 which may be integral with the electrode grid. In the silver-zinc battery construction the electrode 1 would generally be the positive electrode. The electrode 1 is shown in the fold of a U-shaped sheet of material which exhibits a substantial increase in thickness when wet with the electrolyte. Particular example of such materials are cellulosic materials such as regenerated cellulose and cellophane. Interposed between the sheet 3 and the electrode 1 is a sheet of bibulous material 4 which is also U-shaped. The construction of the electrode 1 and the bibulous sheet 4 are illustrative of conventional construction and form no part of the present invention. In accordance with the present invention the top edge of the cellulosic sheet 3 is folded back and forth upon itself to provide the extra thicknesses 5 and 6 where it extends above the top edge 7 of the electrode 1.

Figure 2:
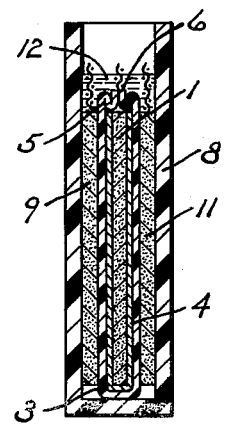
FIG. 2 is a side elevation taken in section of the battery separator electrode assembly shown in FIG. 1 utilized in a battery and wet with electrolyte.

Referring now to FIG. 2 the battery separator and electrode assembly of FIG. 1 is shown as it would be utilized in a battery. Similar reference characters have been employed to designate components identical to those in FIG. 1. As shown, the numeral 8 designates a battery container housing the electrodes 9, 1, and 11 which are immersed in an electrolyte 12. As will be understood by those skilled in the art, the electrodes 9 and 11 are of the same polarity. In accordance with the present invention the sheet of cellulosic material 3 has expanded in the electrolyte 12 and the extra thicknesses 6 and 7 provided by the folds at the upstanding ends of the sheet 3 have bridged together across the top 7 of the electrode 1, substantially sealing the same. In the case of a silver-zinc battery construction, this would provide a means for preventing the bridging of the zinc negative active material into contact with the silver positive electrode. In addition, it will also prevent the harmful exposure of electrode 1 to the air. In this respect to should be understood that it is not necessary that the entire assembly be completely immersed in the electrolyte as shown in FIG. 2, inasmuch as it is characteristic of cellulosic materials in general to be easily wet as a result of capilarity and undergo the expansion illustrated. The number of folds provided on the upstanding edge of the cellulosic sheet 3 will, of course, depend upon the thickness of the electrode. For exceptionally thin electrodes a single fold may be sufficient with the number of folds increasing with the thickness of the electrode to be so protected.

Figure 3:
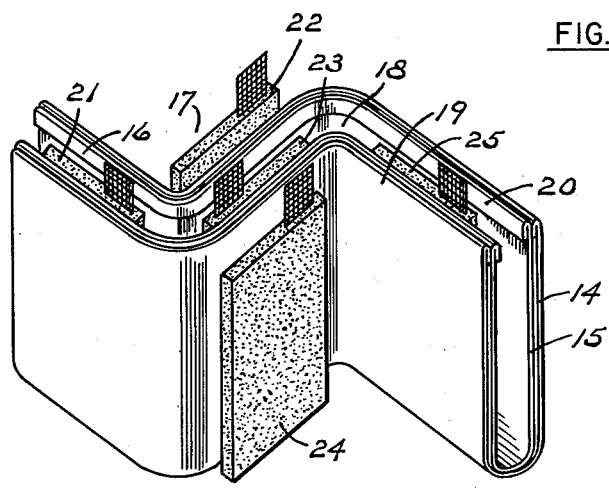
FIG. 3 is a perspective view of an accordian-wrapped electrode assembly (partly completed) embodying the construction of the present invention.

The teachings of the present invention are applicable to other electrode constructions, as for example, it may be applied to a single sheet of separator material in contrast to the U-shaped form illustrated. In addition, the top edge folds described may be applied to more complicated separator systems as illustrated in FIG. 3. In this figure there is shown a so-called accordian-wrapped electrode assembly utilizing a plurality of cellulosic sheets 14 and 15 which are folded along a horizontal line and folded in a zigzag fashion to form a plurality of electrode compartments, 16, 17, 18, 19, and 20. In this construction, compartment 16 houses the electrode 21, compartment 17 the electrode 22, compartment 18 the electrode 23, compartment 19 the electrode 24, and compartment 20 the electrode 25. Accordingly, the electrodes 21, 23, and 25 are of one polarity and the electrodes 22 and 24 of the opposite polarity. As illustrated in FIG. 1, the teachings of the present invention may also be utilized with additional separator material either to further isolate the cellulosic material from the surface of a particular electrode or to act as a reservoir for electrolyte.

From the foregoing it can be seen that by means of the present invention it is possible to utilize the swelling of separator material such as the cellulosic materials to effectively seal the top edge of an electrode. As explained hereinbefore, the invention is applicable to many separator systems and also may be used with plural layers of the separator materials. These and other modifications and adaptations will be obvious to persons skilled in the art and changes may be made in the form of the invention Having described the invention that which is claimed as new is:

1. An electric battery having a positive electrode and a negative electrode, a separator between said electrodes comprising a sheet of electrolyte permeable insulating material of the type which exhibits a substantial increase in thickness when wet with electrolyte, at least one free-end portion of said separator extending above said electrodes, at least one of said free-end portions extending above said electrodes being folded over upon itself at least once above said electrodes to provide at least one additional thickness of said sheet material above said electrodes which upon increasing in thickness when wet with electrolyte will extend over the top of an adjacent electrode.

2. A battery in accordance with claim 1 wherein said electrolyte permeable insulating material is selected from the group consisting of regenerated cellulose and cellophane.

3. In an electric battery, an electrode assembly comprising, in combination, an electrode and a separator comprising at least one sheet of an electrolyte permeable insulating material of the type which exhibits a substantial increase in thickness when wet with electrolyte, said separator being folded over the bottom edge of said electrode with two upstanding portions extending above the top edge of said electrode on both sides thereof and thereby enclosing said electrode, each free-end protion of said separator extending above the electrode being folded inward upon itself at least once at its upstanding edges to provide additional thicknesses of said separator material above said electrode which when wet with electrolyte will swell and bridge across the top of said electrode.

4. An electrode assembly in accordance with claim 3 wherein said electrolyte permeable insulating material is selected from the group consisting of regenerated cellulose and cellophane.

5. In an alkaline battery, an electrode assembly comprising, in combination, an electrode and a separator comprising at least one sheet of an electrolyte permeable insulating material of the type which exhibits a substantial increase in thickness when wet with alkaline electrolyte, said separator being folded over the bottom edge of said electrode with two upstanding portions extending above the top edge of said electrode on both sides thereof and thereby enclosing said electrode, each free-end portion of said separator extending above said electrode being folded back and forth upon itself at its upstanding edges to provide a plurality of additional thicknesses of said separator material above said electrode which when wet with electrolyte will swell and bridge together across the top of said electrode.

6. An electrode assembly in accordance with claim 5 wherein said electrolyte permeable insulating material is selected from the group consisting of regenerated cellulose and cellophane.

References Cited by the Examiner

UNITED STATES PATENTS

| | | | |
|---|---|---|---|
| 2,594,710 | 4/52 | Andre | 136—6.2 |
| 2,773,924 | 12/56 | Brill et al. | 136—6.2 |
| 2,851,509 | 9/58 | Pasquale et al. | 136—143 |
| 2,890,261 | 6/59 | Andre | 136—9 |
| 3,081,371 | 3/63 | Toda et al. | 136—146 X |
| 3,092,438 | 6/63 | Kruger | 136—146 X |

WINSTON A. DOUGLAS, *Primary Examiner.*

JOHN H. MACK, MURRAY TILLMAN, *Examiners.*